United States Patent
Teboulle

(10) Patent No.: US 10,852,167 B2
(45) Date of Patent: Dec. 1, 2020

(54) ULTRASONIC FLOW METER COMPENSATING FOR A MEASUREMENT DRIFT DUE TO AGEING TRANSDUCERS BY ADJUSTING THE MEASUREMENT TRIP BASED ON A COMPENSATION TRIP TIME

(71) Applicant: SAGEMCOM ENERGY & TELECOM SAS, Rueil-Malmaison (FR)

(72) Inventor: Henri Teboulle, Rueil-Malmaison (FR)

(73) Assignee: Sagemcom Energy & Telecom SAS, Rueil Malmaison (FR)

( * ) Notice: Subject to any disclaimer, the term of this patent is extended or adjusted under 35 U.S.C. 154(b) by 0 days.

(21) Appl. No.: 16/605,451

(22) PCT Filed: Mar. 30, 2018

(86) PCT No.: PCT/EP2018/058352
§ 371 (c)(1),
(2) Date: Oct. 15, 2019

(87) PCT Pub. No.: WO2018/197159
PCT Pub. Date: Nov. 1, 2018

(65) Prior Publication Data
US 2020/0232829 A1 Jul. 23, 2020

(30) Foreign Application Priority Data

Apr. 25, 2017 (FR) ..................... 17 53548

(51) Int. Cl.
*G01F 1/66* (2006.01)
*G01F 15/02* (2006.01)

(52) U.S. Cl.
CPC .............. *G01F 1/662* (2013.01); *G01F 1/667* (2013.01); *G01F 15/02* (2013.01)

(58) Field of Classification Search
None
See application file for complete search history.

(56) References Cited

U.S. PATENT DOCUMENTS

| 4,003,252 A | 1/1977 | Dewath |
| 6,089,104 A * | 7/2000 | Chang ..................... G01F 1/662 73/861.27 |

(Continued)

*Primary Examiner* — Harshad R Patel
(74) *Attorney, Agent, or Firm* — Muncy, Geissler, Olds & Lowe, P.C.

(57) ABSTRACT

Method for measuring a speed of a fluid, implemented by an ultrasonic flow meter including a reflector mirror positioned between two transducers. The measuring method includes measurement phases in which: one of the two transducers emits an ultrasonic measurement signal; the other of the two transducers receives the ultrasonic measurement signal after it has completed a measurement trip; evaluate the speed of the fluid depending on a measurement trip time. The measurement method furthermore includes compensation phases in which: one of the two transducers emits an ultrasonic compensation signal; the transducer receives the ultrasonic compensation signal after it has completed a compensation trip during which it was reflected by the reflector mirror; compensate for a measurement drift of the transducer by adjusting the measurement trip time depending on a compensation trip time.

12 Claims, 5 Drawing Sheets

(56) References Cited

U.S. PATENT DOCUMENTS

| | | | |
|---|---|---|---|
| 6,539,812 B1* | 4/2003 | Bergamini | G01F 1/662 |
| | | | 73/861.29 |
| 2002/0143480 A1 | 10/2002 | Komatsu et al. | |
| 2003/0136193 A1 | 7/2003 | Fujimoto | |
| 2010/0094570 A1* | 4/2010 | Gonia | G01F 15/063 |
| | | | 702/49 |
| 2012/0266676 A1 | 10/2012 | Mueller et al. | |
| 2019/0226893 A1* | 7/2019 | Kuhlemann | G01F 1/662 |
| 2020/0109977 A1* | 4/2020 | Sai | G01F 1/662 |

\* cited by examiner

ULTRASONIC FLOW METER COMPENSATING FOR A MEASUREMENT DRIFT DUE TO AGEING TRANSDUCERS BY ADJUSTING THE MEASUREMENT TRIP BASED ON A COMPENSATION TRIP TIME

The invention relates to the field of methods of measuring a fluid speed.

BACKGROUND OF THE INVENTION

In order to measure a flow rate of a fluid flowing in a pipe, an ultrasonic flow meter conventionally makes use of a device for measuring the speed of the fluid by emitting and receiving ultrasound measurement signals.

The measurement device includes a duct connected to the pipe in which the fluid flows. In order to measure the speed of the fluid, an ultrasound measurement signal is emitted into the duct to travel along a path of defined length, the times of flight taken by the ultrasound measurement signal to travel along the path of defined length both from upstream to downstream and from downstream to upstream are measured, and the speed of the fluid is estimated on the basis in particular of the defined length and of the difference between the times of flight.

Such a measurement device 1, sometimes referred to as a "classical pipe" device, is shown in FIG. 1. The measurement device 1 comprises a first transducer 2a, a second transducer 2b, and a measurement module 3 connected to the first transducer 2a and to the second transducer 2b.

The first transducer 2a and the second transducer 2b are paired in terms of frequency and emission level. By way of example, the first transducer 2a and the second transducer 2b are piezoelectric transducers.

The path of defined length is thus a rectilinear path of length L between the first transducer 2a and the second transducer 2b.

The first transducer 2a emits an ultrasound measurement signal Se. By way of example, the ultrasound measurement signal is generated from a squarewave signal 4. The second transducer 2b receives an ultrasound signal Sr resulting from the ultrasound measurement signal Se propagating in the fluid.

The measurement module 3 measures the time of flight taken by the ultrasound measurement signal Se to travel along the path of defined length from upstream to downstream. In reality, the measurement module 3 measures a global transfer time $T_{AB}$ from the first transducer 2a to the second transducer 2b.

The global transfer time $T_{AB}$ is such that: $T_{AB} = TA_A + ToF_{AB} + TR_B$, where:

$TA_A$ is a switch-on time of the first transducer 2a;

$ToF_{AB}$ corresponds to the time of flight taken by the ultrasound measurement signal Se to travel along the path of defined length between the first transducer 2a and the second transducer 2b;

$TR_B$ is a reception time of the second transducer 2b.

Likewise, the second transducer 2b emits an ultrasound measurement signal that is received by the first transducer 2a.

The measurement module 3 thus measures a global transfer time $T_{BA}$ from the second transducer 2b to the first transducer 2a.

The measurement module 3 then calculates the mean speed $\overline{V}$ of the fluid by using the following formula:

$$\Delta T = T_{BA} - T_{AB} = (\overline{V} \cdot 2L)/c^2,$$

where c the speed of an ultrasound wave in the fluid. For example, the speed of an ultrasound wave in water is equal to approximately 1500 meters per second (m/s), and it depends on the temperature of the water.

The lifetime of an ultrasonic fluid meter lies typically in the range 15 years to 20 years. During that lifetime, the components of the first transducer 2a and of the second transducer 2b suffer ageing effects. In particular, the reception times of the first transducer 2a and of the second transducer 2b tend to drift, thereby reducing the accuracy with which the speed of the fluid is measured.

OBJECT OF THE INVENTION

An object of the invention is to compensate for measurement drift suffered by an ultrasonic fluid meter and due to the ageing of the transducers of the ultrasonic fluid meter.

SUMMARY OF THE INVENTION

In order to achieve this object, there is provided a method of measuring a speed of a fluid, the method being performed by an ultrasonic fluid meter having two transducers, a reflector mirror positioned between the two transducers, and processor means, the measurement method comprising measurement stages, each comprising measurement steps, during which:

one of the two transducers emits an ultrasound measurement signal;

the other one of the two transducers receives the ultrasound measurement signal after it has traveled along a measurement path;

the processor means evaluate the speed of the fluid as a function of the measured time of flight taken by the ultrasound measurement signal to travel along the measurement path;

the measurement method further comprising compensation stages, each comprising compensation steps, during which:

one of the two transducers emits an ultrasound compensation signal;

said transducer receives the ultrasound compensation signal after it has traveled along a compensation path during which it is reflected by the reflector mirror;

the processor means compensate any measurement drift of said transducer by adjusting the measured time of flight as a function of a compensation time of flight taken by the ultrasound compensation signal to travel along the compensation path.

Adjusting the measured time of flight serves to compensate for any measurement drift suffered by the ultrasonic fluid meter and due to ageing of the transducers of the ultrasonic fluid meter.

There is also provided a measurement method as described above, wherein the ultrasonic fluid meter also includes a temperature sensor, and wherein the processor means also adjust the measured time of flight as a function of a measured temperature of the fluid during the measurement stage.

There is also provided a measurement method as described above, wherein the ultrasonic fluid meter further includes a memory storing a reference table comprising reference temperature values, and together with each reference temperature value, a reference time taken by an ultrasound reference signal to travel along the compensation path when the ageing of the transducers is negligible, and wherein the adjustment of the measured time of flight consists in extracting a reference time from the reference table corresponding to a reference temperature identical to the measured temperature, and in adding to or subtracting from the measured time of flight a difference between the compensation time of flight and the reference time.

There is also provided a measurement method as described above, wherein the compensation stages comprise training stages during which:

the temperature sensor measures the temperature of the fluid and produces reference temperatures;

for each reference temperature, the processor means measure the reference time taken by the ultrasound reference signal to travel along the compensation path, and incorporate the reference temperature and the reference time in the reference table.

There is also provided a measurement method as described above, wherein the training stages are performed during a preliminary period of predetermined duration that begins after installing the ultrasonic fluid meter.

There is also provided a measurement method as described above, wherein the reference table is filled in prior to installing the ultrasonic fluid meter.

There is also provided an ultrasonic fluid meter comprising a duct incorporating two transducers and a reflector mirror positioned between the two transducers, and processor means arranged to perform the measurement method as described above.

There is also provided a meter as described above, including two reflector mirrors, each reflector mirror being positioned in the proximity of a respective one of the transducers.

There is also provided a meter as described above, wherein the transducers are piezoelectric transducers.

There is also provided a meter as described above, wherein each of the transducers and the reflector mirror is annular in shape and fits closely to an inside wall of the duct.

There is also provided a meter as described above, wherein the width of each transducer lies in the range 8% to 12% of an inside diameter of the duct, and wherein the width of the reflector mirror lies in the range 3% to 5% of the inside diameter of the duct.

There is also provided a computer program including instructions for enabling an ultrasonic fluid meter to perform the measurement method as described above.

There are also provided storage means that store a computer program including instructions for enabling an ultrasonic fluid meter to perform the measurement method as described above.

Other characteristics and advantages of the invention appear on reading the following description of a particular, nonlimiting embodiment of the invention.

BRIEF DESCRIPTION OF THE DRAWINGS

Reference is made to the accompanying drawings, in which.

DETAILED DESCRIPTION OF THE INVENTION

Figure 1:
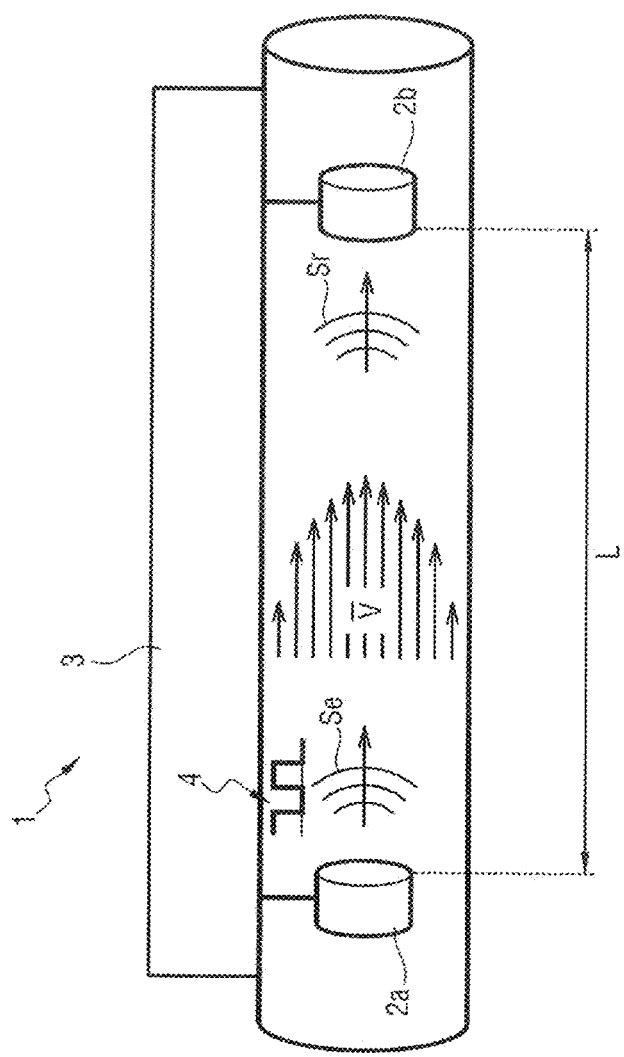
FIG. 1 shows a prior art ultrasonic fluid meter.
Figure 2:
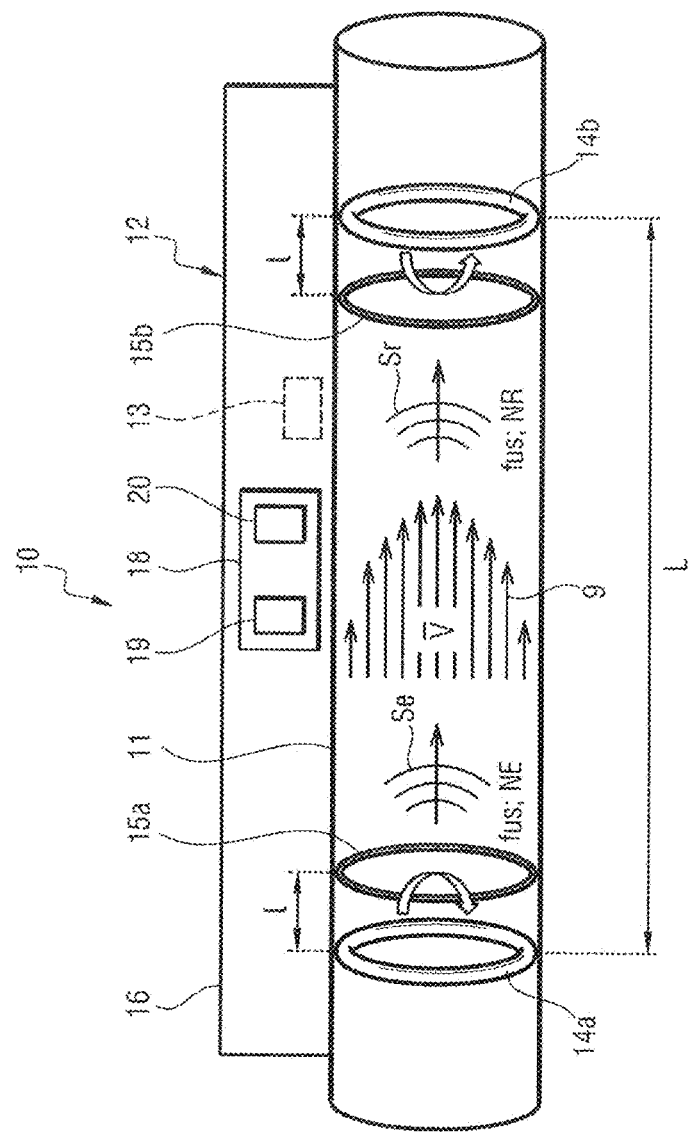
FIG. 2 shows an ultrasonic fluid meter in which the measurement method of the invention is performed.

With reference to FIG. 2, the method of the invention for measuring a fluid speed is performed in this example in an ultrasonic water meter.

The ultrasonic water meter 10 comprises a duct 11 in which there flows water as supplied by a distribution network to an installation, a measurement device 12 for measuring the speed of the water, and a temperature sensor that measures the temperature of the water in the duct 11.

The water flows in the duct 11 from upstream to downstream, as represented by the direction of arrows 9 visible in FIG. 2. The water could equally well flow from downstream to upstream, with the mean speed $\bar{V}$ of the fluid then being negative.

The measurement device 12 comprises a first transducer 14a, a second transducer 14b, a first reflector mirror 15a, a second reflector mirror 15b, and a measurement module 16.

The first transducer 14a and the second transducer 14b are paired. In this example, the first transducer 14a and the second transducer 14b are piezoelectric transducers.

The first transducer 14a and the second transducer 14b are spaced apart by a defined length L.

Figure 3:
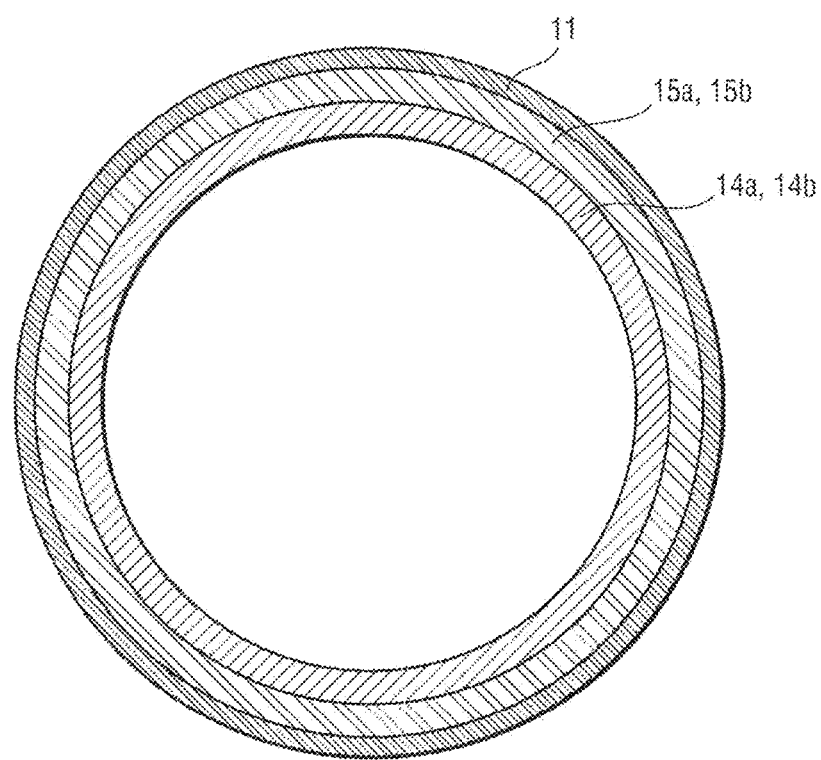
FIG. 3 shows a duct of a measurement device of the ultrasonic fluid meter in which the measurement method of the invention is performed, the duct being shown in section on a plane perpendicular to the axis of the duct.

With reference to FIG. 3, the first transducer 14a and the second transducer 14b are each annular in shape, fitting closely against an inside wall of the duct 11.

The width of the first and second transducers 14a and 14b (i.e. the difference between the outside diameter and the inside diameter of the first and second transducers 14a and 14b) lies in the range 8% to 12% of the inside diameter of the duct 11. In this example, the width of the first and second transducers 14a and 40b is equal to 10% of the inside diameter of the duct 11.

Each of the first and second transducers 14a and 14b comprises a metal body, made out of stainless steel in this example, that contains a piezoelectric ring. The metal bodies of the first and second transducers 14a and 14b are screwed to the duct 11.

Likewise, each of the first and second of reflector mirrors 15a and 15b presents an annular shape that fits closely to the inside wall of the duct 11.

Both of the first and second of reflector mirrors 15a and 15b are located between the first transducer 14a and the second transducer 14b.

The first reflector mirror 15a is situated in the proximity of the first transducer 14a, and the second reflector mirror 15b is situated in the proximity of the second transducer 14b. The first reflector mirror 15a is situated at a distance $\ell$ from the first transducer 14a, and the second reflector mirror 15b is situated at a distance $\ell$ from the second transducer 14b, with the distance $\ell$ in this example being equal to 6 millimeters (mm).

The width of the first and second reflector mirrors 15a and 15b lies in the range 3% to 5% of the inside diameter of the duct 11. In this example, the width of the first and second reflector mirrors 15a and 15b is equal to 4% of the inside diameter of the duct 11.

The first and second reflector mirrors 15a and 15b are made of aluminum and they are screwed to the duct 11. The duct 11 presents two zones of reduced diameter forming shoulders. During fabrication of the ultrasonic water meter 10, the first and second reflector mirrors 15a and 15b are inserted into the duct 11, and each of them comes into abutment against a respective one of the shoulders prior to being screwed to the duct 11. This ensures that the first and second reflector mirrors 15a and 15b are accurately positioned longitudinally inside the duct 11.

It should be observed that the transducers 14 and the reflector mirrors 15 are screwed from the outside of the duct 11 via tapped holes formed in the thickness of the duct 11. The duct 11 is made watertight by applying a resin to the screws and to the tapped holes.

The measurement module 16 comprises processor means 18 including an "intelligent" processor component 19 adapted to execute instructions of a program for performing the various steps of the measurement method of the invention. In this example, the processor component 19 is a microcontroller, however it could be some other component, e.g. a processor or a field programmable gate array (FPGA). The processor means 18 also includes a memory 20.

The processor means 18 are arranged in particular to control the first and second transducers 14a and 14b in order to acquire the electrical signals produced by the first and second transducers 14a and 14b, in order to process these electrical signals, etc.

The description begins with the manner in which the speed of the water is measured by the measurement device 12 of the ultrasonic water meter 10.

Each of the first and second transducers 14a and 14b performs in succession the function of an ultrasound measurement signal emitter and the function of an ultrasound measurement signal receiver.

The processor means 18 thus provide the emitter with electrical signals that are transformed by the emitter into ultrasound measurement signals Se. In this example, the electrical signals are squarewave signals. The processor means 18 acquire the ultrasound measurement signals Sr received by the receiver.

The emitter emits the ultrasound measurement signals Se at an emission frequency fus. In this example, the frequency fus lies in the range 900 kilohertz (kHz) to 4 megahertz (MHz).

The ultrasound measurement signals Se thus travel from upstream to downstream and from downstream to upstream along a path of defined length L between the first transducer 14a and the second transducer 14b. In this example, the measurement path is a rectilinear path between the first transducer 14a and the second transducer 14b.

In FIG. 2, the first transducer 14a is shown as performing the function of an emitter, and the second transducer 14b is shown as performing the function of a receiver. The ultrasound measurement signal Se thus travels along the measurement path from upstream to downstream. The ultrasound measurement signal Se is emitted by the emitter at a level NE. The received ultrasound measurement signal Sr is received by the receiver at a level NR that is lower than the level NE.

The measurement method of the invention comprises measurement stages that are repeated at regular intervals.

During each measurement stage, the processor means 18 measure a measured time of flight from upstream to downstream taken by the ultrasound measurement signal Se to follow the measurement path from upstream to downstream, and they then measure a measured time of flight from downstream to upstream taken by the ultrasound measurement signal Se to follow the measurement path from downstream to upstream, and finally they evaluate the speed of the water as a function of these measured times of flight.

Figure 4:
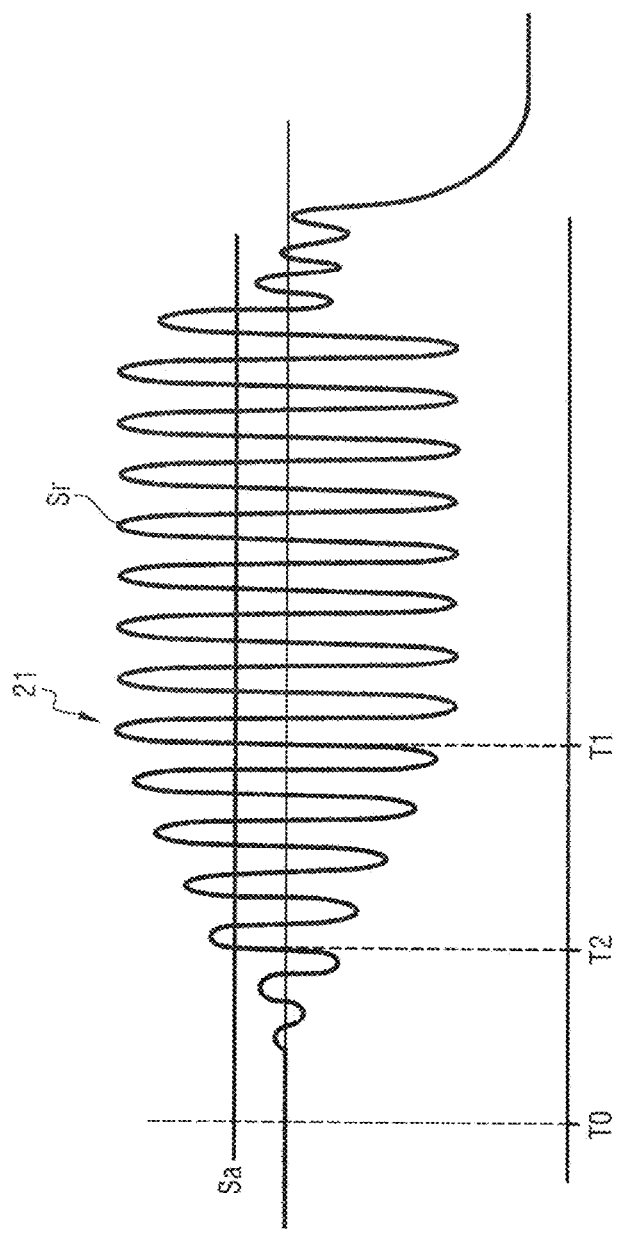
FIG. 4 shows an ultrasound measurement signal received after it has traveled along a path of defined length.

FIG. 4 shows a received ultrasound measurement signal Sr, as received by the receiver after travelling along the measurement path (from upstream to downstream or from downstream to upstream).

The receiver activates reception at a moment T0, synchronized with the emission of the ultrasound measurement signal Se. This synchronization is made possible by the emitter and the receiver being paired and also by the fact that the measurement module 16 controls both of the ultrasound transducers.

The time of flight is measured on the basis of determining a moment of arrival T1 for a predetermined lobe 21 of the received ultrasound measurement signal Sr.

In this example, the moment of arrival T1 is the instant at which a rising front of the predetermined lobe 21 arrives. The moment of arrival T1 is measured by a zero crossing type method.

The predetermined lobe 21 is a $j^{th}$ lobe of the received ultrasound measurement signal Sr after the received ultrasound measurement signal Sr presents an amplitude that exceeds a predetermined amplitude threshold Sa at a time T2. Specifically, in this example the $j^{th}$ lobe is the fourth lobe.

The speed of the water is then evaluated by the processor means 18 as a function of measuring an upstream to downstream time of flight and of measuring a downstream to upstream time of flight.

The speed of the water is proportional to a difference between the downstream to upstream time of flight measurement and the upstream to downstream time of flight measurement.

It should be observed that in this example, the measured speed of the water is an average speed for the water across the diameter of the duct 11, given that the speeds of masses of water differ from the center of the duct 11 to the proximity of the walls of the duct.

It should also be observed that the annular shape of the transducers 14 and of the reflector mirrors 15 performs the function of a water regulator in the duct 11, and makes it possible to obtain measurements of water speed under good conditions of stability for the stream of water.

In addition to measurement stages, the measurement method of the invention includes compensation stages for the purpose of compensating measurement drift due to the ageing of the first and second transducers 14a and 14b.

The description begins with the general principle of compensation.

As explained above, the mean speed of water in the duct 11 is evaluated on the basis of the times of flight as measured in the upstream to downstream direction and in the downstream to upstream direction.

However, the "measurement time of flight", as measured by the first transducer 14a and the second transducer 14b, is in reality a global transfer time.

The upstream to downstream global transfer time $T_{AB}$ is such that:

$$T_{AB} = TA_A + \text{ToF}_{AB} + TR_B, \text{ where:}$$

$TA_A$ is a switch-on time of the first transducer 14a;

$\text{ToF}_{AB}$ corresponds to the time of flight taken by the ultrasound measurement signal Se to travel along the measurement path between the first transducer 14a and the second transducer 14b;

$TR_B$ is a reception time of the second transducer 14b.

The downstream to upstream global transfer time $T_{BA}$ is such that:

$$T_{BA} = TA_B + \text{ToF}_{BA} + TR_A, \text{ where:}$$

$TA_B$ is a switch-on time of the second transducer 14b;

$ToF_{BA}$ corresponds to the time of flight taken by the ultrasound measurement signal Se to travel along the measurement path between the second transducer 14b and the first transducer 14a;

$TR_A$ is a reception time of the first transducer 14a.

The speed of the water is thus estimated from the following difference:

$$\Delta T = T_{BA} - T_{AB} = (TA_B + ToF_{BA} + TR_A) - (TA_A + ToF_{AB} + TR_B).$$

It can clearly be seen that the switch-on times and the reception times are involved in estimating the speed of the water, and that any drift in the switch-on times and/or the reception times has an impact on the accuracy of the measurement.

Consideration is given initially to the situation in which the drift of the switch-on times is negligible compared with the drift of the reception times.

Compensation consists in using the first reflector mirror 15a and the second reflector mirror 15b to estimate the drift of the reception times of the first transducer 14a and of the second transducer 14b.

The first transducer 14a initially acts as an emitter and subsequently as a receiver.

A first ultrasound compensation signal, similar to the above-mentioned ultrasound measurement signal Se, is emitted by the first transducer 14a. The first ultrasound compensation signal travels along a first compensation path during which the first ultrasound compensation signal is reflected by the first reflector mirror 15a and it is then received by the first transducer 14a. The first compensation path is thus a go-and-return path between the first transducer 14a and the first reflector mirror 15a.

The processor means 18 then measure a first compensation time of flight taken by the first ultrasound compensation signal to travel along the first compensation path.

The "first compensation time of flight" is in reality a first local transfer time $TL_A$.

The first local transfer time $TL_A$ is estimated in the same manner as the measured time of flight (or more exactly the global transfer times $T_{AB}$ and $T_{BA}$), i.e. by determining the moment the fifth predetermined lobe of the reflected first ultrasound compensation signal reaches and is received by the first transducer 14a.

Figure 5:
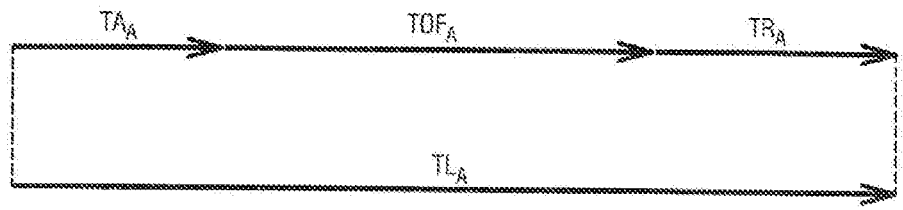
FIG. 5 shows the first local transfer time $TL_A$ between a first transducer and itself.

With reference to FIG. 5, the first local transfer time $TL_A$ is equal to:

$$TL_A = TA_A + ToF_{AA} + TR_A, \text{ where:}$$

$TA_A$ is the switch-on time of the first transducer 14a;

$ToF_{AA}$ corresponds to the time-of-flight taken by the first ultrasound compensation signal to travel along the first compensation path from the first transducer 14a to the first reflector mirror 15a and from the first reflector mirror 15a to the first transducer 14A;

$TR_A$ is the reception time of the first transducer 14a.

Because the distance between the first transducer 14a and the first reflector mirror 15a (equal in this example to 6 mm, i.e. 12 mm for the go-at-return path), and given the speed of an ultrasound wave in water (about 1500 meters per second (m/s)), the time-of-flight $ToF_{AA}$ is about 8 microseconds (µs).

The piezoelectric ring of the first transducer 14a is excited by a squarewave signal for a duration of 8 µs at the most, such that the first transducer 14a has stopped emitting in order to listen for the echo associated with the reflection of the first ultrasound compensation signal, and thus to receive the first ultrasound compensation signal after it has been reflected by the first reflector mirror 15a.

Thereafter, the second transducer 14b acts in turn as an emitter and then as a receiver. A second ultrasound compensation signal is emitted by the second transducer 14b.

The processor means 18 then evaluate a second local transfer time $TL_B$ from the second transducer 14b to the second reflector mirror 15b, and from the second reflector mirror 15b to the second transducer 14b.

The second local transfer time $TL_B$ is equal to:

$$TL_B = TA_B + ToF_{BB} + TR_B, \text{ where:}$$

$TA_B$ is the turn-on time of the second transducer 14b;

$ToF_{BB}$ corresponds to the time-of-flight taken by the second ultrasound compensation signal to travel along the second compensation path from the second transducer 14b to the second reflector mirror 15b, and from the second reflector mirror 15b to the second transducer 14b;

$TR_B$ is the reception time of the second transducer 14b.

Because the distance between the second transducer 14b and the second reflector mirror 15b (equal in this example to 6 mm, i.e. 12 mm for the go-at-return path), and given the speed of an ultrasound wave in water (about 1500 meters per second (m/s)), the time-of-flight $ToF_{BB}$ is about 8 µs.

Compensation is thus performed on the basis of the first local transfer time $TL_A$ and of the second local transfer time $TL_B$.

Nevertheless, it should be observed that times of flight depend on the temperature of the water. Compensation thus also makes use of reference times $TL_{A\_Ref}$ and $TL_{B\_Ref}$. The reference times $TL_{A\_Ref}$ and $TL_{B\_Ref}$ are local transfer times measured while ageing is negligible, and at a temperature identical to the temperature of the water at the time when compensation is performed.

The processor means 18 thus calculate:

$$\Delta T_A = TL_A - TL_{A\_Ref}; \text{ and}$$

$$\Delta T_B = TL_B - TL_{B\_Ref}.$$

However, since the switch-on time drift is negligible compared with the reception time drift, it can be considered to a first approximation that the switch-on times do not vary. Thus:

$$\Delta T_A = TR_A - TR_{A\_Ref};$$

$$\Delta T_B = TR_B - TR_{B\_Ref}.$$

The measurement drift due to the ageing of the first transducer 14a and of the second transducer 14b can then be compensated in the difference $\Delta T = T_{BA} - T_{AB}$ used for estimating the speed of the water, by subtracting $\Delta T_B$ from $T_{AB}$ and $\Delta T_A$ from $T_{BA}$.

Alternatively, consideration may be given to the situation in which the drift of the reception times is negligible compared with the drift of the switch-on times.

The processor means 18 thus calculate:

$$\Delta T_A = TL_A - TL_{A\_Ref}; \text{ and}$$

$$\Delta T_B = TL_B - TL_{B\_Ref}.$$

However, since the reception time drift is negligible compared with the switch-on time drift, it can be considered to a first approximation that the reception times do not vary. Thus:

$$\Delta T_A = TA_A - TA_{A\_Ref};$$

$$\Delta T_B = TA_B - TA_{B\_Ref}.$$

The measurement drift due to the ageing of the first transducer 14a and of the second transducer 14b can then be compensated in the difference $\Delta T = T_{BA} - T_{AB}$ used for estimating the speed of the water, by subtracting $\Delta T_A$ from $T_{AB}$ and $\Delta T_B$ from $T_{BA}$.

The description above is thus a description of the general principle of compensation. There follows a description of practical performance of the compensation stages. It can be seen that the compensation stages comprise training stages and stages of compensation proper.

Each compensation stage is performed between two measurement stages. Each compensation stage is intended to compensate the measurement of the speed of the water that was taken during the measurement stage preceding said compensation stage.

It should be observed, that in order to improve measurement accuracy, at any given instant, each ultrasound measurement is repeated several tens of times (typically 80 times) and the arithmetic mean is taken in order to deduce the measurement that is to be used.

Figure 6:
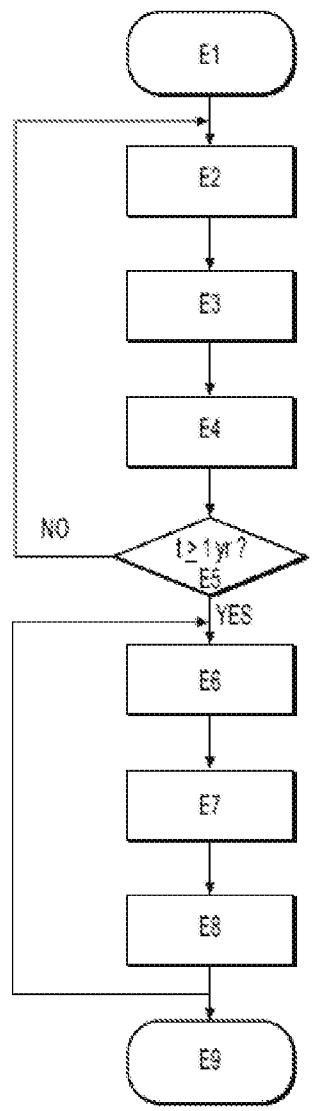
FIG. 6 shows steps of the measurement method of the invention.

With reference to FIG. 6, the stages of compensation begin with a (single) initialization step (step E1), that takes place after the ultrasonic fluid meter 10 has been installed and put into operation. During the initialization step, a variable "t" is initialized to zero. The value of the variable t is incremented as a function of an output from a counter, so that the variable t measures the time that has elapsed since the initialization step.

After the initialization step, the first compensation stages are training stages.

During each training stage, the temperature sensor 13 of the ultrasonic fluid meter 10 measures the temperature of the water and produces a reference temperature that is acquired by the processor means 18 (step E2).

The processor means 18 then control of the first transducer 14a so that it acts as an emitter and then as a receiver.

A first ultrasound reference signal is emitted by the first transducer 14a, and travels along the first compensation path. The processor means 18 then measure a first reference time taken by the first ultrasound reference signal to travel along the first compensation path.

Thereafter, the processor means 18 then control the second transducer 14b so that, in turn, it acts as an emitter and then as a receiver.

A second ultrasound reference signal is emitted by the second transducer 14b, and travels along the second compensation path. The processor means 18 then measure a second reference time taken by the second ultrasound reference signal to travel along the second compensation path (step E3).

The first ultrasound reference signal and the second ultrasound reference signal are emitted at instants that are far enough apart to ensure that the measurement of the first reference time and the measurement of the second reference time do not disturb each other.

The reference temperature, the first reference time, and the second reference time are then incorporated in a reference table, which is stored in the memory 20 of the processor means (step E4).

The reference table is thus indexed by the reference temperature values. In this example, the reference temperature values are acquired and stored with a step size of 1° C.

Thereafter, the variable t is compared with a predetermined duration, which, in this example, is equal to 1 year (step E5). If the value of the variable t is less than the predetermined duration of 1 year, the above-described process is repeated during the next compensation stage. The next compensation stage is then another training stage.

It can thus be understood that the training stages are performed solely during a preliminary period of predetermined duration, which is equal to 1 year in this example. During these training stages, no compensation is actually performed, since the ageing of the first and second transducers 14a and 14b is negligible during the predetermined duration. The training stages are thus used to fill in the reference table of the memory 20 with the reference temperatures, the first reference times, and the second reference times.

On returning to step E5, when the value of the variable t becomes greater than or equal to the predetermined duration of 1 year, then the next compensation stage is an actual stage of compensation.

During an actual compensation stage, the temperature sensor 13 of the ultrasonic fluid meter 10 measures the temperature of the water (step E6). The resulting water temperature is considered as being equal to the measured temperature of the water during the measurement stage that preceded the actual compensation stage.

Thereafter, the processor means 18 measure the first and second compensation times of flight (step E7).

Thereafter, the processor means 18 extract first and second reference times from the reference table that corresponded to a reference temperature identical to the measured temperature.

The processor means 18 then calculate the above-mentioned $\Delta T_A$ and $\Delta T_B$, and compensate the measurement drift of the first and second transducers 14a and 14b by adjusting the upstream to downstream measured time of flight (or more exactly the upstream to downstream global transfer time) and the downstream to upstream measured time of flight (or more exactly the downstream to upstream global transfer time) by using $\Delta T_A$ and $\Delta T_B$ (step E8).

The following compensation stage is once more an actual compensation stage: the step E6 follows the step E8. All of the following compensation stages are actual compensation stages, up to a (single) final stage corresponding to the end of life, to replacement, or to performing a maintenance operation on the ultrasonic fluid meter 10 (step E9).

Alternatively, it is possible to omit performing a training stage, and to fill in the reference table prior to installing the ultrasonic fluid meter 10.

The reference table may then be filled in at the time the ultrasonic fluid meter 10 is designed. A single reference table can then be used for all of the ultrasonic fluid meters 10 of a given model.

The reference table may also be filled in in the factory, at the time of the ultrasonic fluid meter 10 is fabricated, by performing calibration operations.

Naturally, the invention is not limited to the embodiment described, but covers any variant coming within the ambit of the invention as defined by the claims.

The invention is naturally not limited to measuring the speed of water, but applies to any type of fluid (e.g. a gas or oil).

It is not necessary to use two reflector mirrors in order to perform the invention. It is perfectly possible to use only one reflector mirror positioned between the first and second transducers. Under such circumstances, the first compensation path is a go-and-return path between the first transducer and the reflector mirror, and the second compensation path is a go-and-return path between the second transducer and the reflector mirror.

All of the numerical values provided herein are used to illustrate the invention, and they could naturally be different when performing the invention.

The invention claimed is:

1. A method of measuring a speed of a fluid, the method being performed by an ultrasonic fluid meter having a duct, two transducers, two reflector mirrors positioned between the two transducers, and processor means, the measurement method comprising measurement stages, each comprising measurement steps, during which:

one of the two transducers emits an ultrasound measurement signal;

the other one of the two transducers receives the ultrasound measurement signal after it has traveled along a measurement path;

the processor means evaluate the speed of the fluid as a function of a measured time of flight taken by the ultrasound measurement signal to travel along the measurement path;

the measurement method further comprising compensation stages, each comprising compensation steps, during which:

one of the two transducers emits an ultrasound compensation signal;

the one of the two transducers receives the ultrasound compensation signal after it has traveled along a compensation path during which it is reflected by one of the two reflector mirrors;

the processor means compensate any measurement drift of the one of the two transducer by adjusting the measured time of flight as a function of a compensation time of flight taken by the ultrasound compensation signal to travel along the compensation path, wherein each of the two transducers and the two reflector mirror is annular in shape and fits closely to an inside wall of the duct.

2. The method of measuring a speed of a fluid according to claim 1, wherein the ultrasonic fluid meter also includes a temperature sensor, and wherein the processor means also adjust the measured time of flight as a function of a measured temperature of the fluid during the measurement stage.

3. The method of measuring a speed of a fluid according to claim 2, wherein the ultrasonic fluid meter further includes a memory storing a reference table comprising reference temperature values, and together with each reference temperature value, a reference time taken by an ultrasound reference signal to travel along the compensation path when the ageing of the transducers is negligible, and wherein an adjustment of the measured time of flight consists in extracting a reference time from the reference table corresponding to a reference temperature identical to the measured temperature, and in adding to or subtracting from the measured time of flight a difference between the compensation time of flight and the reference time.

4. The method of measuring a speed of a fluid according to claim 3, wherein the compensation stages include training stages, during which:

the temperature sensor measures the temperature of the fluid and produces reference temperatures;

for each reference temperature, the processor means measure the reference time taken by the ultrasound reference signal to travel along the compensation path, and incorporate the reference temperature and the reference time in the reference table.

5. The method of measuring a speed of a fluid according to claim 4, wherein the training stages are performed during a preliminary period of predetermined duration that begins after installing the ultrasonic fluid meter.

6. The method of measuring a speed of a fluid according to claim 3, wherein the reference table is filled in prior to installing the ultrasonic fluid meter.

7. The method of measuring a speed of a fluid of claim 1, wherein a computer program is configured to instruct the ultrasonic fluid meter to perform the measurement steps and the compensation steps.

8. The method of measuring a speed of a fluid of claim 7, wherein the processor means includes a storage configured to store the computer program.

9. An ultrasonic fluid meter for measuring a speed of a fluid, comprising:

a duct;

two transducers;

two reflector mirrors positioned between the two transducers; and processor means, wherein the duct incorporates the two transducers and the two reflector mirrors, wherein each of the two transducers and the two reflector mirror is annular in shape and fits closely to an inside wall of the duct.

10. The ultrasonic fluid meter for measuring a speed of a fluid according to claim 9, wherein each of the two reflector mirrors are positioned in a proximity of a respective one of the two transducers.

11. The ultrasonic fluid meter for measuring a speed of a fluid according to claim 9, wherein the two transducers are piezoelectric transducers.

12. The ultrasonic fluid meter for measuring a speed of a fluid according to claim 9, wherein a width of each transducer lies in a range of 8% to 12% of an inside diameter of the duct, and wherein a width of each reflector mirror lies in a range of 3% to 5% of the inside diameter of the duct.

* * * * *